United States Patent [19]

Wiewiorowski

[11] Patent Number: 4,666,685
[45] Date of Patent: May 19, 1987

[54] SELECTIVE EXTRACTION OF MOLYBDENUM AND VANADIUM FROM SPENT CATALYSTS BY OXIDATIVE LEACHING WITH SODIUM ALUMINATE AND CAUSTIC

[75] Inventor: Edward I. Wiewiorowski, New Orleans, La.

[73] Assignee: Amax Inc., Greenwich, Conn.

[21] Appl. No.: 861,689

[22] Filed: May 9, 1986

[51] Int. Cl.$^4$ .................. C01G 31/00; C01G 39/00
[52] U.S. Cl. .......................................... 423/55; 423/53; 423/62; 423/66; 423/68; 423/127; 423/131; 423/140; 423/147; 423/150; 75/101 R; 75/108; 75/119; 75/121; 502/25
[58] Field of Search ............ 423/68, 66, 63, 54, 423/55, 53, 62, 127, 131, 140, 147, 150; 502/25; 75/101 R

[56] References Cited

U.S. PATENT DOCUMENTS

| 1,709,284 | 4/1929 | Sauer | 502/25 |
| 2,208,616 | 7/1940 | Wellman et al. | 502/25 |
| 3,824,193 | 7/1974 | Williams et al. | 502/25 |
| 4,145,397 | 3/1979 | Toida et al. | 423/68 |
| 4,401,631 | 8/1983 | Canavesi et al. | 502/25 |
| 4,495,157 | 1/1985 | Sebenik et al. | 423/63 |

FOREIGN PATENT DOCUMENTS

| 0052896 | 4/1977 | Japan | 423/68 |
| 0108091 | 9/1978 | Japan | 423/68 |

Primary Examiner—John Doll
Assistant Examiner—Robert L. Stoll
Attorney, Agent, or Firm—Michael A. Ciomek; Eugene J. Kalil

[57] ABSTRACT

Spent hydrodesulfurization catalysts containing alumina, at least one metal from the group consisting of molybdenum, tungsten and vanadium and at least one metal from the group consisting of nickel and cobalt, sulfur, and, usually, residual oil are oxygen pressure leached at a temperature of at least about 400° F. with a base from the group consisting of sodium hydroxide and sodium aluminte in at least stoichimetric amount to yield a solution having a pH between about 7 and 9 containing dissolved molybdenum, vanadium and any tungsten which may be recovered and a readily filterable residue containing aluminum, nickel and cobalt which may be worked up to recover the valuable constituents, with overall processing being accomplished in an environmentally acceptable manner.

9 Claims, No Drawings

SELECTIVE EXTRACTION OF MOLYBDENUM AND VANADIUM FROM SPENT CATALYSTS BY OXIDATIVE LEACHING WITH SODIUM ALUMINATE AND CAUSTIC

The present invention is directed to the recovery of valuable metals including molybdenum, vanadium, nickel and cobalt from spent catalyst using sodium hydroxide and/or sodium aluminate as lixiviant.

BACKGROUND OF THE INVENTION AND THE PRIOR ART

The art has recognized for a number of years now the need for upgrading various petroleum feedstocks to remove therefrom various contaminants including sulfur, metals such as nickel, vanadium and iron. For example, it is pointed out in U.S. Pat. No. 4,500,495 that this objective is accomplished by processing the feedstock with a catalyst in the presence of hydrogen. The catalysts employed generally have a solid support such as alumina provided with catalytic metals such as molybdenum or tungsten with either nickel or cobalt. As the catalyst is used, metals and sulfur from the feedstock deposit thereon and/or combine therewith until the activity of the catalyst is impaired to the extent that the desired product quality in the hydrodesulfurized feedstock is no longer achieved. The resulting spent catalyst thus comprises catalytic metals, an inorganic support matrix, e.g., alumina ceramic balls or other shapes, metals removed from the feedstock, sulfur compounds and residual oil. Substantial quantities of spent catalyst on the order of many tons are now being generated annually as poorer grades of feedstock are now being treated. The spent catalyst raises problems on the one side in relation to environmentally acceptable disposition due to its generally oily, sticky physical nature and high sulfur content, and on the other side offers the possibility of reclaiming valuable metals from it.

Although many proposals have been reported in the literature, none of the proposals made to date has been completely acceptable from the standpoint of recovering metals and alumina present in the spent catalyst in marketable form while recovering sulfur as sodium sulfate, and yielding solid, gaseous and/or liquid by-products which may safely be released to the environment. U.S. Pat. No. 4,495,157 proposed oxygen pressure leaching of spent hydrodesulfurization catalyst using sodium carbonate in the leach slurry. The process and other proposals are operative but are still subject to improvement by way of reducing reagent cost, improving metal recovery, improving filterability and reducing weight and volume of solids generated in the leaching steps and affording lower temperatures and pressures for leaching.

Spent hydrodesulfurization catalysts can vary considerably in composition and in response to treatment. Thus, the materials may contain up to 16% of metal from the group consisting of molybdenum and tungsten, up to 6% titanium, up to 10% silicon, up to 15% vanadium, at least one metal from the group consisting of up to 12% nickel and up to 6% cobalt, up to 12% sulfur, up to 10% coke, up to 20% oil and the balance alumina. Because of the susceptibility of the material to undergo spontaneous combustion, no economical means presently exists for disposal of the material in an acceptable fashion.

SUMMARY OF THE INVENTION

The invention is directed to the treatment of spent catalysts, in particular spent hydrodesulfurization catalysts, to recover metal values contained therein in marketable form, to recover the sulfur content thereof as sodium sulfate, to recover the alumina content in marketable form, to convert the hydrocarbon and carbon contents to carbon dioxide and water and to conduct the process in an environmentally benign manner. The spent catalyst, which may for example contain, by weight, about 1% to about 10% molybdenum, about 1% to about 15% vanadium, about 1% to about 12% nickel, about 1% to about 6% cobalt, about 1% to about 6% titanium, about 1% to about 10% silicon, about 2% to about 12% sulfur, about 1% to about 40% carbonaceous materials, up to about 20% oil and the balance alumina, is slurried with water and sodium hydroxide and/or sodium aluminate in an amount at least stoichiometrically sufficient to convert, in the presence of oxygen, molybdenum to sodium molybdate, tungsten to sodium tungstate, vanadium to sodium vanadate and sulfur to sodium sulfate. The slurry is heated in a pressure vessel to a temperature of about 150° to 250° C. (300° to 500° F.) and a total pressure of about 120 to about 600 psig, e.g., 150 to 400 psig, with oxygen at an overpressure of at least about 25 to about 100 psig in an amount sufficient to oxidize the sulfur and carbon compounds in the catalyst substantially completely. The generated carbon dioxide is continuously bled from the system to maintain minimal $CO_2$ overpressures. Retention time of the reactants under pressure is sufficiently long to solubilize molybdenum as molybdate and vanadium as vanadate while oxidizing organic matter and carbon and sulfur in the catalyst to sulfate, carbon dioxide and water. The caustic addition, which can comprise sodium aluminate obtained by recycling or from other sources, and the temperature should be controlled such that the leach slurry is discharged at a pH not exceeding about 9, e.g., about 7 to about 9, to provide high extraction of molybdenum and vanadium, good filterability in the leach solids and low aluminum, titanium and silicon contents, not exceeding about 100 ppm each, preferably not more than 10 ppm each, in the leach liquor. The aluminum, titanium, silicon, nickel and cobalt contents remain in the leach solids, while molybdenum and vanadium (and tungsten, if any be present) are substantially completely dissolved.

The leach products are separated, with the leach liquor being worked up for recovery of molybdenum and vanadium. For example, the leach residue may be digested with sodium hydroxide to dissolve alumina therefrom as sodium aluminate, using a caustic soda in the digestion slurry at a concentration sufficient to dissolve alumina, e.g., a pH of at least about 14. The digested solids contain essentially all the nickel and cobalt present in the original catalyst and may be worked up for recovery of these metals. Digestion may be accomplished in the temperature range of about 200° C. to about 300° C., preferably in a closed vessel adapted to withstand the steam pressure associated with such temperature, using oxidizing conditions such as an oxygen overpressure of about 25 to about 100 psig. Supplemental caustic soda can be introduced into the leach to maintain the needed high pH. The leach solution can be treated for alumina recovery and to provide a sodium aluminate solution which can be recycled to leach further spent catalyst. Recycling provides efficient use of caustic and also provides a bleed of molybdenum and vanadium from the digestion circuit with improved recovery of these metals from the first stage leach solution. Aluminum compounds present in the recycle solution are precipitated in the first stage leach solids in readily filterable form by a process believed to be hydrothermal, mineral forming, precipitation. Other means may be employed to work up the initial leach residue. The recovery of molybdenum and vanadium and treatment of the leach residue may be accomplished in accordance with the teachings of U.S. Pat. No. 4495157, which patent is incorporated herein by reference.

DETAILED DESCRIPTION OF THE PROCESS

In a slurry forming operation the spent catalyst is mixed with an aqueous sodium hydroxide or a sodium aluminate solution or mixtures thereof to emulsify the oil in the catalyst and to form a stable slurry. This operation can be conducted in a ball mill or any other size reduction equipment at ambient or elevated temperatures. The aqueous alkaline slurry is charged with the addition of any needed caustic material to provide the necessary initial content of sodium aluminate and/or sodium hydroxide, for example, 100% to 180% of stoichiometric requirement for the leaching which is preferably conducted in a pressurized vessel. The alkali metal materials are supplied in quantity sufficient to provide a hydroxyl ion content of about 5 to 40 gpl, e.g., about 15 to about 35 gpl. A solids content in the slurry of about 50 to about 200 gpl is employed. The autoclave charge is brought up to a temperature of at least about 350° F. (180° C.) and oxygen or air at an oxygen overpressure of about 25 to about 150 psig $O_2$ is introduced. The oxidative leach process is exothermic. Further oxygen can be introduced during the run and a compensating bleed of the reaction atmosphere to remove carbon dioxide and steam may be provided. Sulfur oxides are not discharged. The run is conducted for sufficient time to accomplish substantially complete oxidation of the oil and sulfur in the catalyst and conversion of molybdenum and vanadium to sodium molybdate and sodium vanadate. It is essential to carry out this reaction so that the pH of discharge slurry is in the range of 7 to 9 and the temperature should be approximately 400° F. Higher temperatures and pressures may be employed if desired, but economics essentially dictate operating conditions. Retention times in the autoclave normally exceed 30 minutes and may be up to 2 hours or more, with 90 minutes being generally sufficient to achieve satisfactory extractions of metals and depression of aluminum, titanium and silicon which is believed to be based on a hydrothermal, mineral forming, process where the interaction of temperature, pressure and pH in the system is most essential to obtain the desired low residual levels of aluminum, titanium and silicon in the solution.

The contents of the autoclave then proceed to solids-liquid separation wherein the solids containing aluminum, nickel and cobalt are separated from the liquid containing dissolved molybdenum and vanadium. The solids may be washed to remove supernatant liquid remaining and the washings will accompany the leach liquor to recovery of metals from the liquor.

The leach residue can be further processed with sodium hydroxide according to various schemes depending on the desirability of reclaiming any particular metal remaining in the residue. It is to be appreciated that, while high solubilization of molybdenum and vanadium is accomplished in the initial leach, small amounts of these elements will remain with the leach solids and will be carried along in further processing. Removal of these metals is necessary as otherwise product contamination occurs and continuous operation becomes difficult.

Some examples will now be given:

EXAMPLE 1

A spent hydrodesulfurization catalyst which contained by weight, 14.6% oil, 5.7% support balls, 4.1% molybdenum, 7% vanadium, 1.3% nickel, 1.4% cobalt, 7.4% sulfur, 6.3% carbon, 1.8% sodium, 0.17% calcium, 0.25% silicon, 0.03% chlorine and the balance alumina and oxygen was mixed with water and 150% stoichiometric sodium hydroxide (25 grams per liter sodium hydroxide) and fed to a 7-inch diameter carbon lined ball mill. The weight of grinding balls used was approximately the same as the weight of the catalyst feed. The balls were of mixed sizes; 50% 1-inch, 25% each ¾ inch and ½ inch. The charge was ground for four hours and the ball mill contents were wet screened through a ½-inch screen to separate the grinding balls and then through a ¼-inch screen to separate and recover the catalyst support balls. The support balls were hard and did not show any weight loss in the process. They could be re-used for fresh catalyst preparation. The balls and screens were water washed to bring the slurry to the desired solids concentration of 90 grams per liter. The slurry solids were 90% minus 200 mesh and 85% minus 400 mesh.

1000 milliliters of the slurry were charged into an agitated 2 liter Parr autoclave and heated to a leaching temperature 10° F. below the desired test temperature. Oxygen at 100 psig was injected and the mixture then reacted for 90 minutes. The leach solution was assayed for Al and the metal extraction was calculated based on the assay of the washed, dried (at 120° C. (250° F.)) leach solids. Results are shown in Table 1:

TABLE 1

| Temp. °F. | Temp. °C. | Oxygen Partial Pressure, Psig | Total Press. (psig) | Discharge pH | System | Extraction % MO | % V | % S | Alumina Conc. In Leach gpl Al |
|---|---|---|---|---|---|---|---|---|---|
| 200 | 93 | Atmospheric | Atmospheric | 12 | Open | 89 | 85 | 10 | 6.0 |
| 300 | 149 | 100 | 150 | 11.1 | Pressurized, Venting Applied | 97 | 90 | 92 | 1.5 |
| 392 | 200 | 100 | 330 | 8.0 | Pressurized, Venting Applied | 97 | 90 | 98 | 0.070 |

EXAMPLE 2

This example demonstrates the effect of temperature on the system at the end of the leach process.

A slurry of catalyst as described in Example 1 having a solids concentration of 90 grams per liter (excluding oil and support balls) was reacted with 25 grams per liter of sodium hydroxide (150% of the stoichiometric requirement) at an oxygen overpressure for 90 minutes in a Parr autoclave with the following results:

TABLE 2

| Temp. °F. | Pressure psig | Discharge pH | Al glp | Metals Extraction, % (Solids Basis) V | Mo |
|---|---|---|---|---|---|
| 302 | 154 | 11.0 | 1.49 | 96.7 | 96.5 |
| 347 | 214 | 9.7 | .16 | 95.6 | 97.6 |
| 392 | 310 | 8.7 | 0.03 | 92.6 | 98.0 |

The tests show high metal extractions for molybdenum and vanadium. The tests also show that terminal pH control in the leach is important to reduce soluble aluminum in the leach solution to a value below 100 ppm, preferably below 50 ppm. This can be achieved by the combined effect of temperature which should be at least about 390° F. (200° C.) and which should be controlled in the range of about 7 to about 8.8 or 9. Solids discharged from the autoclave show good settling and filtration characteristics.

EXAMPLE 3

This Example demonstrates that the lixiviant employed in the first step leach can contain high concentrations of soluble aluminim while still retaining good results in terms of limiting soluble aluminum in the resulting leach liquor to low values and still obtaining high recoveries of molybdenum and vanadium. A series of leaching tests was conducted using as lixiviant a mixture of sodium aluminate solution containing 184 gpl Al and 50% sodium hydroxide solution mixed in varying proportions.

The test catalyst was the same as that described in Example 1, the solids concentration was 90 gpl, the autoclave charge temperature was 392° F., the retention time was 90 minutes and oxygen overpressure was 100 psig.

Six tests were conducted, with the stoichiometric amounts of sodium hydroxide and sodium aluminate being given in Table 3 and the test results being given in Tables 4A and 4B. It was assumed that sodium from NaOH and sodium from sodium aluminate both contributed to leaching power and stoichiometry was based upon the conversion of Mo to $Na_2MoO_4$, vanadium to $NaVO_3$ and sulfur to $Na_2SO_4$.

TABLE 3

| | TEST CONDITIONS | | | |
|---|---|---|---|---|
| Test No. | Sodium Hydroxide Addition (% of Stoich. Req.) | Sodium Aluminate Addition (% of Stoich. Req.) | Total Reagents Addition (% of Stoich. Req.) | Al Addition to Feed gpl Soluble Al |
| 1 | 97.3 | 46.9 | 144.2 | 7.82 |
| 2 | 131.8 | 18.7 | 150.5 | 3.13 |
| 3 | 113 | 37.5 | 150.5 | 6.26 |
| 4 | 147 | 28.1 | 175.1 | 4.69 |
| 5 | 144.3 | 56.2 | 200.5 | 9.38 |
| 6 | 163 | 37.5 | 200.5 | 6.26 |

TABLE 4A

| | TEST RESULTS | | | | | |
|---|---|---|---|---|---|---|
| | | Leach Solution | | | | |
| Test No. | Final pH | EMF mV | V gpl | Mo gpl | Al gpl | Na gpl |
| 1 | 7.7 | 150 | 4.40 | 4.20 | .04 | 15.0 |
| 2 | 6.6 | 205 | 4.92 | 4.33 | .03 | 15.0 |
| 3 | 5.8 | 260 | 4.01 | 3.67 | .03 | 15.0 |
| 4 | 7.54 | 240 | 5.02 | 4.23 | .03 | 17.0 |
| 5 | 6.98 | 220 | 4.59 | 4.23 | .04 | 16.0 |
| 6 | 7.8 | 118 | 4.95 | 4.51 | .04 | 19.0 |

TABLE 4B

| Test No. | Wt. Gain % | Leach Solids V % | Mo % | Al % | NA % | S % | Metal Extrac. (Solids Basis) V % | Mo % | S % |
|---|---|---|---|---|---|---|---|---|---|
| 1 | 1.6 | 1.05 | .17 | 15.7 | .62 | .20 | 84.4 | 95.8 | 97.3 |
| 2 | 5.9 | .02 | .16 | 19.4 | 1.6 | .35 | 86.1 | 96.0 | 95.0 |
| 3 | 7.1 | 1.22 | .31 | 15.4 | .51 | .10 | 81.3 | 91.9 | 98.5 |
| 4 | 8.1 | .68 | .10 | 18.5 | 1.2 | .20 | 89.5 | 97.4 | 97.1 |
| 5 | 28.6 | .97 | .14 | 21.6 | 1.3 | .17 | 82.2 | 95.6 | 97.0 |
| 6 | 22.6 | .63 | .10 | 22.8 | 2.3 | .36 | 89.0 | 97.0 | 94.0 |

The tests show that sodium hydroxide-sodium aluminate systems can be used as lixiviants in the leach while providing aluminum contents in the leach solution below 50 ppm, with molybdenum extractions of 95% or more and vanadium extractions on the order of 90%. The pH range for discharge liquors should be about 7 to about 9. The tests confirm that solutions from alumina processing can be recycled to the leach thereby providing a bleed for molybdenum, vanadium and any organics. Good filterability of resulting leach solids is obtained.

EXAMPLE 4

This example shows that a sodium aluminate solution alone with no addition of virgin sodium hydroxide can be applied as lixiviant. A series of leaching tests was carried out on the catalyst described in Example 1 using mother liquor from the alumina processing circuit. This solution assayed 24.5 gpl Al (42.3 gpl $Al_2O_3$) 5.5 gpl V and 3.1 gpl Mo. The sodium hydroxide concentration in the sodium aluminate solution was 65.7 gpl "free NaOH", 102 gpl total NaOH. About 36% of the leaching power was supplied by sodium aluminate in all the tests which were carried out with an initial solids concentration of 90 gpl, at 200° C. (392° F.), with an oxygen overpressure of 100 psig $O_2$ and retention time 90 min. The results are presented in Table 5.

TABLE 5

| Reagent Addition % Of Stoich. Require. | Discharge pH | Aluminum Concentration ppm Al Initial | Residual | Aluminum Depression % | Metals Extraction % Mo | % V |
|---|---|---|---|---|---|---|
| 111.6 | 5.9 | 6600 | 40 | 99.6 | 71.0 | 86.3 |
| 148.6 | 7.0 | 8800 | 50 | 99.6 | 81.5 | 95.9 |
| 163.8 | 7.1 | 9700 | 40 | 99.7 | 81.9 | 94.4 |
| 181.0 | 8.1 | 10700 | 50 | 99.7 | 90.0 | 98.3 |

The tests show that recycled sodium aluminate solutions without the addition of fresh sodium hydroxide can be applied as lixiviant and desired metal extractions as well as selectivity can be achieved. It will be appreciated that sodium aluminate recycled from integrated processing schemes for reclaiming alumina from the processed material can be advantageously and conveniently utilized providing a highly efficient usage of the caustic supplied to the process and a possibility of bleeding off molybdenum, vanadium and organics which otherwise would build up in various steps of any integrated processing scheme.

EXAMPLE 5

A de-oiled catalyst from a different source was used in this series of tests; it contained 0.8% oil and assayed on no oil basis: 3.50% Mo, 15.5% V, 2.34% Ni, 0.78% Co, 22.1% Al and 14.4% S. All tests were carried out with 90 gpl solids initially in the system at 392° F. with an oxygen overpressure of 100 psig $O_2$ and a retention time of 90 min. The results are shown in Table 6.

TABLE 6

| Reagent Dosage % Stoichiometric Requirement | Leach Solution | | | Metals Extraction | | |
|---|---|---|---|---|---|---|
| | pH | Ni ppm | Al ppm | Mo % | V % | S % |
| 72 | 2.7 | 850 | 800 | 79.7 | 76.9 | 96.2 |
| 95 | 5.6 | 230 | 30 | 86.3 | 82.7 | 96.7 |
| 100 | 4.9 | 230 | 30 | 92.4 | 84.3 | 96.5 |
| 111 | 6.0 | 200 | 10 | 94.9 | 82.9 | 96.7 |
| 117 | 6.9 | 10 | 10 | 96.9 | 91.9 | 96.9 |
| 117 | 6.8 | 10 | 10 | 95.7 | 85.5 | 95.4 |
| 121 | 8.4 | 10 | 20 | 98.8 | 92.7 | 97.0 |

The results show the interaction between meeting the stoichiometric requirement and discharge pH and the response of alumina and nickel concentration in the leach solutions. The aluminum concentration can be controlled at below 10 ppm Al when process parameters are accurately controlled. Temperature, reagent and catalyst dosage as well as discharge pH are the key variables, the interaction of those variables determines the alumina depression in the hydrothermal process as well as metals extractions. De-oiled catalysts can be treated in accordance with the invention.

EXAMPLE 6

A spent catalyst from a different source than that of the material described in the previous examples and containing 7.0% oil assayed on a "no oil" basis 3.7% Mo, 12.8% V, 1.3% Co, 20% Al, 0.06% Cu, 0.34% Fe, 1.6% Si, 0.51% Na, 3.1% Ni and 12.6% S was leached with sodium hydroxide, at 90 gpl solids ("no oil" basis) at 100 psig oxygen overpressure for 90 minutes residue time. Two tests were run with assays of the leach solution and assays of the leach solids being given in Table 7.

TABLE 7

| | TEST CONDITIONS | | | |
|---|---|---|---|---|
| Test No. | Temp. °F. | Reagent Addition (% Stoich. Req.) | Leach Solution pH | Al gpl |
| 1 | 300 | 143 | 11.4 | 11.1 |
| 2 | 400 | 143 | 6.9 | .05 |

| | TEST RESULTS | | | | | | |
|---|---|---|---|---|---|---|---|
| | Leach Solids | | | | | Metals Extraction (Solids Bas.) | |
| Test No. | Mo % | V % | Ni % | Co % | Al % | Mo % | V % |
| 1 | .39 | 1.57 | 3.40 | 1.45 | 18.8 | 91.0 | 89.5 |
| 2 | .12 | 1.14 | 3.26 | 1.43 | 20.2 | 97.0 | 91.9 |

The tests confirmed that even when a spent HDS catalyst of a distinctly different composition is used, high extractions of Mo and V were obtained and the aluminum concentration in the leach liquor can be controlled at about or below 50 ppm Al by the combined effect of temperature and pH.

EXAMPLE 7

This example shows that a catalyst containing high levels of titanium can be processed according to the invention—it assayed on a "no oil" basis 6.9% Mo, 2.6% V, 36% Al, 3.5% Ni, 0.03% Co, 0.6% S, 4.2% Ti, 0.08% Na, 0.3% Fe, and 0.01% Cu. A slurry of this catalyst having solids concentration of 100 grams per liter was reacted with 130% of the stoichiometric requirement of sodium hydroxide at 400° F. and an oxygen overpressure of 100 psig $O_2$ for 90 min. in a Parr autoclave with the following results:

TABLE 8

| Leach Solution Assay | | | | | | | |
|---|---|---|---|---|---|---|---|
| Discharge pH | Mo gpl | V gpl | Al gpl | Ni gpl | Co gpl | Si gpl | Ti gpl |
| 7.8 | 5.9 | 0.80 | <0.01 | <0.01 | <0.01 | 0.02 | <0.02 |

| Leach Residue Assay | | | | | | Metal Extractions | | |
|---|---|---|---|---|---|---|---|---|
| % Mo | % V | % Al | % Ni | % Co | % Fe | Wt. Loss % | % Mo | % V |
| 0.49 | 0.54 | 34.7 | 3.7 | 0.03 | 0.31 | 9.5 | 93.6 | 81.2 |

The tests show that a high metal extraction was achieved. The leach solutions contained less than 10 ppm Al and less than 20 ppm Ti.

EXAMPLE 8

This example shows that a material containing high levels of molybdenum but virtually no vanadium or sulfur can be processed according to the invention it assayed on "no oil" basis 15.1% Mo, 0.01%, V, 19.8% Al, 2% Ni, 0.48% Co, 0.5% S, 8.9% Si, 0.28% Na, 0.07% Fe and 0.05% Cu.

A slurry of this catalyst having a solids concentration of 100 gram per liter was reacted with 130% of the stoichiometric requirement of sodium hydroxide at 400° F. and an oxygen overpressure of 100 psi $O_2$ for 90 min. in a Parr autoclave with the following results:

TABLE 9

| Leach Solution Assay | | | | | | |
|---|---|---|---|---|---|---|
| pH | Mo gpl | V gpl | Al gpl | Ni gpl | Co gpl | Si gpl |
| 7.1 | 11.2 | 0.02 | <0.01 | <0.01 | <0.01 | 0.05 |

| Leach Solution Assay | | | | | | Extraction (%) | |
|---|---|---|---|---|---|---|---|
| % Mo | % V | % Al | % Ni | % Co | % Fe | Wt. Loss | Mo |
| 1.6 | 0.05 | 24.5 | 2.6 | 0.72 | 0.07 | 30.2 | 92.6 |

The example shows that high molybdenum extractions can be achieved from a material containing practically no vanadium or sulfur.

EXAMPLE 9

This example shows that materials containing high levels of silicon (about 10% Si) can be processed according to the invention. It assayed on "no oil" basis: 2.96% Mo, 9.36% V, 14.6% Al, 2.2% Ni, 1.0% Co, 0.24% Fe, 0.40% Na, 9.2% S and 10.3% Si. A slurry of this catalyst having 100 grams per liter was reacted with sodium hydroxide at an oxygen overpressure of 100 psi $O_2$ for 90 min. Two tests at 392° F. and 400° F. with sodium hydroxide additions of, respectively, 125 and 175% of the stoichiometric requirement were carried out. The results are presented in Tables 10A and 10B.

TABLE 10A

| Test No. | Temp. °F. | Reagent Dosage % Stoich. Req. | pH | Leach Liquor Composition | | | |
|---|---|---|---|---|---|---|---|
| | | | | Mo gpl | V gpl | Al gpl | Si gpl |
| 1 | 392 | 125 | 5.2 | 3.3 | 6.8 | 0.03 | 0.34 |
| 2 | 450 | 175 | 7.0 | 3.5 | 7.5 | <0.01 | 0.01 |

TABLE 10B

| Test No. | Leach Residue Assay | | | | | Extraction | |
|---|---|---|---|---|---|---|---|
| | Wt. Gain % | Mo % | V % | Ni % | Co % | Mo % | V % |
| 1 | 3.7 | 0.19 | 1.9 | 1.9 | 0.98 | 93.6 | 79.7 |
| 2 | 5.3 | 0.03 | 1.6 | 1.9 | 0.97 | 98.9 | 82.3 |

Satisfactory metal extractions were observed in materials containing about 10% Si. The silica level can be depressed to the 10 ppm Si level when proper reagent stoichiometry, temperature (over 400° F.) and pressure is employed. The mechanism of silica depression appears to be based on the formation of sodium nepheline ($Na_2O.Al_2O_3.2SiO_2$) under hydrothermal conditions. This mineral was identified as major component of the leach residue by X-ray diffraction. The good filterability of the leach residue is believed to be a result of the formation of this mineral.

EXAMPLE 10

This example compares the results obtained in using sodium aluminate-sodium hydroxide, sodium hydroxide and sodium carbonate as lixiviant in the leach. The spent catalyst used was that described in Example 1 and oxygen pressure leaching was conducted in an agitated 2 liter Parr autoclave using a temperature of 400° F. (204° C.), an oxygen overpressure of 100 psig and a retention time of 90 minutes. Results are given in Table 8.

TABLE 11

| Reagent | Solids Conc. in Feed, gpl | Reagent Dosage % Stoich. | pH of Leach Liquor | Al Conc. in Leach Liquor Initial | (ppm Al) Final | Metals Extract. % Mo | % V |
|---|---|---|---|---|---|---|---|
| $Na_2CO_3$ | 100 | 150 | 9.0 | — | 69 | 93.7 | 81.6 |
| NaOH | 125 | 150 | 8.5 | — | 60 | 98.0 | 89.2 |
| Na Al O(OH) + NaOH | 119 | 140 | 7.6 | 5400 | 10 | 95.0 | 81.5 |

The results indicated that equivalent or higher recoveries of Mo and V can be achieved with sodium hydroxide and sodium aluminate compared to sodium carbonate.

It will be appreciated that aluminum containing caustic solutions recycled from an integrated scheme for processing the leach residue can be advantageously and conveniently utilized as lixiviant in the leaching step. It also will be appreciated that the same reagent, sodium hydroxide, is used in the said leaching step and is also applied in several steps of an integrated scheme for processing the leach residue. This reagent, as marketed in a 50% solution, is a more convenient reagent to handle compared to dry soda ash. Furthermore, the leach liquor from the aluminate-caustic leach does not show fizzling and foaming upon acidification. This is in sharp contrast to the behavior of carbonate leach liquors that are acidified as that operation produces excessive, difficult to control, foaming.

While the mechanisms involved in the sodium hydroxide oxygen pressure leach of spent hydrodesulfurization catalyst are not fully understood, it is believed that entirely different phenomena are involved than is the case when sodium carbonate is used as lixiviant. Thus, it is accepted that sodium carbonate does not dissolve alumina as formation of unsoluble dowsonite occurs according to the reaction:

$$NaAlO(OH)_2 + CO_2 NaAlCO_3(OH)_2.$$

Sodium hydroxide on the other hand dissolves alumina according to the chemical equation:

$$Al_2O_3 + 2NaOH + H_2O NaAlO(OH)_2$$

forming soluble sodium aluminate.

It is believed that the mechanism of aluminum and silicon removal from the leach solution is based on mineral forming processes occurring under hydrothermal conditions. Products in the leach solids have been identified by X-Ray diffraction as gamma AlOOH (aluminium oxide hydroxide);

$Na_2OAl_2O_32SiO_2$ (sodium nepheline);

$Al_{45}O_{45}(OH)_{45}Cl$ (aluminum oxy-hydroxy chloride). The good filterability of the reaction discharge slurry is attributed to the formation of these and possibly other minerals.

As a result of the said mineral formation, the behavior of the leach solids resulting from sodium hydroxide leaching is distinctly different than those resulting from carbonate leaching in terms of quantity of solids, filterability and in particular their settling rates. Compared in Table 12 are settling and filtration rates of solids originating from aluminate, caustic and carbonate leach.

TABLE 12

| Leach Conditions | Carbonate | Hydroxide | Aluminate* |
|---|---|---|---|
| Solids Content in Feed (gpl on no oil basis) | 100 | 90 | 119 |
| Reagent Dosage (% of Stoich. Requirement) | 150 | 150 | 150 |
| Retention Time In Leach (Min.) | 90 | 90 | 90 |
| Flocculant Addition | None | None | None |
| Settling | | | |
| Initial Liquid Solids Interface Drop Rate (inch/min.) | 0.1 | 0.5 | 0.9 |

TABLE 12-continued

|  | Carbonate | Hydroxide | Aluminate* |
|---|---|---|---|
| Supernatant | Cloudy | Clear | Clear |
| Vacuum (inch Hg) | 17 | 17 | 17 |
| Cake Thickness (inches) | 0.3 | 0.3 | 0.25 |
| Filtration |  |  |  |
| Moisture Content in Wet Filter Cake (%) | 71.2 | 49.8 | 43.5 |
| Filtration Rate (gal/sq ft/min) | 0.4 | 0.7 | 0.9 |

The results indicate that the solids from the oxygen pressure leach with aluminate and/or caustic are much more readily filterable than solids resulting from an oxygen pressure leach with sodium carbonate. The latter solids feel to the touch like talcum powder while solids from aluminate leaching feel to the touch like fine beach sand. The improved filtration qualities are more pronounced when aluminum originally in solution is mineralized and readily settling and filterable solids are formed in a hydrothermal process.

While the term "oxygen leaching under hydrothermal conditions" is employed herein, it is to be appreciated that air may be used as an oxygen source.

Although the present invention has been described in conjunction with preferred embodiment, it is to be understood that modifications and variations may be resorted to without departing from the spirit and scope of the invention, as those skilled in the art will readily understood. Such modifications and variations are considered to be within the purview and scope of the invention and appended claims.

We claim:

1. The process for treating spent catalyst containing aluminum, molybdenum, vanadium, sulfur and at least one metal from the group consisting of nickel and cobalt with up to 30%, by weight, oil, to recover the constituents thereof which comprises the steps of:
   (a) slurry preparation wherein the said spent catalyst is mixed with an aqueous solution of at least one base from the group consisting of sodium hydroxide and sodium aluminate to emulsify any oil in said catalyst and to form a stable slurry;
   (b) oxygen pressure leaching the said slurry containing said base from the group consisting of sodium hydroxide and sodium aluminate at a temperature of at least about 300° F. to oxidize and dissolve molybdenum, vanadium and sulfur selectively from said catalyst as sodium molybdate, sodium vanadate and sodium sulfate, respectively, while retaining aluminum and any catalyst-contained nickel and cobalt in a residue;
   (c) discharging the products of said oxygen pressure leach at a pH not exceeding about pH 9; and
   (d) separating the aqueous solution containing said molybdenum, vanadium and sulfur but less than 100 ppm aluminum from said residue.

2. The process in accordance with claim 1 wherein said catalyst contains, by weight, about 1% to about 16% molybdenum, about 1% to about 15% vanadium, up to about 25% nickel, up to about 20% cobalt, up to about 6% titanium, up to about 10% silicon, about 2% to about 12% sulfur, about 1% to about 30% carbon, up to about 30% oil with the balance essentially alumina.

3. The process in accordance with claim 1 wherein said oxygen pressure leaching step is accomplished at a temperature of at least about 400° F. to limit the solubilization of aluminum from said spent catalyst to a value not exceeding about 0.05 gpl Al in said leach solution.

4. The process in accordance with claim 1 wherein a concentration of about 5 to about 40 gpl hydroxyl ion from said base from the group consisting of sodium hydroxide and sodium aluminate is used in said oxygen pressure leaching step.

5. The process in accordance with claim 1 wherein said oxygen pressure leach is accomplished using an oxygen overpressure of about 25 to about 200 psig.

6. The process in accordance with claim 1 wherein said base from the group consisting of sodium hydroxide and sodium aluminate is employed in said oxygen pressure leach in an amount at least stoichiometrically equal to the amount required to convert molybdenum, vanadium and sulfur present in said catalyst slurry to sodium molybdate, sodium vanadate and sodium sulfate.

7. The process in accordance with claim 1 wherein oxygen pressure, sodium hydroxide addition, reaction time and temperature in said pressure leaching step are controlled such that the leach liquor pH at the end of leaching is in the range of about pH 7 to about pH 9.

8. The process for treating an oily, spent hydrodesulfurization catalyst containing aluminum, at least one metal from the group consisting of molybdenum, vanadium and tungsten, at least one metal from the group consisting of nickel and cobalt, and sulfur which comprises forming an aqueous slurry by mixing said catalyst with an aqueous solution containing an amount of a base from the group consisting of sodium hydroxide and sodium aluminate stoichiometrically at least equivalent to convert in the presence of oxygen, the molybdenum, tungsten, vanadium and sulfur contents of said spent catalyst to sodium molybdate, sodium tungstate, sodium vanadate and sodium sulfate, oxygen pressure leaching the resulting slurry at a temperature of at least about 350° F. for a time sufficient to oxidize to carbon dioxide substantially all the oil in said spent catalyst to oxidize to sodium sulfate substantially all the sulfur in said spent catalyst, and to dissolve molybdenum, tungsten and vanadium while producing a solid containing the aluminum, nickel and cobalt, discharging the products of said oxygen pressure leach at a pH not exceeding about pH 9 and separating the liquid containing said metal from the group consisting of molybdenum, tungsten, and vanadium and said sulfur but less than 100 ppm aluminum from said solid.

9. The method in accordance with claim 8 wherein said base addition, leaching temperature and time are controlled to yield a leach solution having a pH in the range pH 7 to pH 9 such that the amount of aluminum in the leach solution is less than 100 ppm.

* * * * *